3,414,478
PROCESS FOR PREPARING L-GLUTAMINE BY FERMENTATION METHOD

Yuichi Noguchi, Junichi Nakajima, Tetsuo Uno, and Toru Nakanishi, Hofu-shi, Japan, assignors to Kyowa Hakko Kogyo Co., Ltd., Tokyo, Japan, a Japanese corporation
No Drawing. Filed Dec. 17, 1965, Ser. No. 514,663
13 Claims. (Cl. 195—29)

The present invention relates to an improved process for the production of L-glutamine by culturing a micro-organism having L-glutamic acid-producing ability in a nutrient medium containing zinc or molybdenum or both, thereby to produce L-glutamine by the fermentation method. The novel process of this invention is characterized inter alia by the remarkably high yield of L-glutamine obtained.

According to a prior procedure, L-glutamic acid fermentation is converted to L-glutamine fermentation with the aid of a microorganism having L-glutamic acid-producing ability, by incorporating into the nutrient medium, in which the fermentation is carried out and which contains available carbon, nitrogen source (for example, urea, ammonium salts such as ammonium chloride, etc.) in an amount exceeding that necessary for the growth of the micro-organism, the concentration being sufficient to provide available nitrogen in an amount greater than 10 parts by weight of available nitrogen per 100 parts by weight of available carbon. The result is accumulation of L-glutamine in the culture solution.

Further research, looking toward enhancing yields in order to achieve production of L-glutamine on an industrially feasible scale, has involved the use in the fermentation medium of a molar equivalent of ATP (adenosine tri-phosphate), according to the following reaction scheme:

Glutamate + ATP ⇌ Glutamylphosphate + ADP [1]

Glutamylphosphate + $NH_3$ ⇌ Glutamine + Phosphate

Glutamate + ATP + $NH_3$ ⇌ Glutamine + ADP + Phosphate

[1] Adenosine di-phosphate.

However, since the nitrogen level in the culture solution is extremely high according to these prior processes, there is a tendency toward considerable inhibition of the living activity of the micro-organism, and the necessity of a growing factor as well as of a producing factor in the L-glutamine fermentation makes the latter much more complicated than the L-glutamic acid fermentation.

The present invention is directed to the embodiment of an L-glutamine fermentation method which is free of the aforementioned prior art deficiencies and which nevertheless achieves the objective of enhanced yield of L-glutamine. This objective is, briefly stated, realized with the aid of a micro-organism having L-glutamic acid-producing ability, the characteristics and decisive factor being that the fermentation is carried out in the presence in the culture medium of more than $10^{-7}$ moles of zinc or molybdenum or both zinc and molybdenum as well as of the usual nutrients required for the growth of the micro-organism.

The following tables make clear the effects realized by the present invention, in terms of the relationship between the said heavy metals and the production of L-glutamine:

TABLE I

| Zinc (moles) | Amount of glutamine produced (mg./ml.) | Amount of bacterial cells (mg./ml.) |
|---|---|---|
| 0 | 12.0 | 12.0 |
| $10^{-7}$ | 16.5 | 11.8 |
| $10^{-6}$ | 25.6 | 12.1 |
| $10^{-5}$ | 27.0 | 12.6 |
| $10^{-4}$ | 26.0 | 12.3 |
| $10^{-3}$ | 22.5 | 11.7 |

TABLE 2

| Molybdenum (moles) | Amount of glutamine produced (mg./ml.) | Amount of bacterial cells (mg./ml.) |
|---|---|---|
| 0 | 12.0 | 12.0 |
| $10^{-7}$ | 14.0 | 11.8 |
| $10^{-6}$ | 18.3 | 12.0 |
| $10^{-5}$ | 20.0 | 12.0 |
| $10^{-4}$ | 16.7 | 11.5 |
| $10^{-3}$ | 15.0 | 11.8 |

TABLE 3

| Zinc (moles) | Molybdenum (moles) | Amount of glutamine produced (mg./ml.) | Amount of bacterial cells (mg./ml.) |
|---|---|---|---|
| 0 | 0 | 12.0 | 12.0 |
| $10^{-7}$ | $10^{-7}$ | 18.7 | 11.5 |
| $10^{-6}$ | $10^{-6}$ | 33.0 | 11.8 |
| $10^{-5}$ | $10^{-5}$ | 32.0 | 11.8 |
| $10^{-4}$ | $10^{-4}$ | 30.0 | 11.0 |
| $10^{-3}$ | $10^{-3}$ | 25.0 | 10.5 |

Note 1.—The micro-organism used in obtaining the data of these tables was *Micrococcus glutamicus* 2141.

Note 2.—Composition of the culture medium employed:

| | |
|---|---|
| Glucose | wt. percent__ 12.0 |
| $KH_2PO_4$ | do____ 0.05 |
| $K_2HPO_4$ | do____ 0.05 |
| $MgSO_4 \cdot 7H_2O$ | do____ 0.05 |
| $MnSO_4 \cdot 4H_2O$ | do____ 0.002 |
| $FeSO_4 \cdot 7H_2O$ | do____ 0.002 |

Composition of the culture medium employed:

| | |
|---|---|
| Urea | wt. percent__ 0.5 |
| $CaCO_3$ | do____ 2.0 |
| Biotin | γ/liter__ 3.0 |
| Thiamine | mg./liter__ 1 |

Note 3.—The zinc and molybdenum were added in the form of $ZnSO_4 \cdot 7H_2O$ and $(NH_4)_6Mo_7O_{24} \cdot 4H_2O$ respectively.

Note 4.—Culture: Flask shaking culture.

Note 5.—Mg./ml. signifies milligram(s) per milliliter. γ/liter signifies gamma(s) per liter. Mg./liter signifies milligrams per liter.

The foregoing tables show that when a micro-organism having L-glutamic acid-producing ability, e.g. *Micrococcus glutamicus*, is used according to the present invention, the amount of glutamine produced is remarkably increased by the addition to the culture medium of more than $10^{-6}$ mole of zinc and/or molybdenum. The effect of the addition of molybdenum alone is less than that of the addition of zinc alone, but the mixed addition of both metals clearly shows a synergetic effect giving (at maximum) 33.0 milligrams per milliliter of accumulated glutamine, which is remarkably high—in fact 2.8 times greater—in comparison with the amount obtained (12.0 mg./ml.) without the addition of these metals.

Since the maximal production of L-glutamine has a tendency to vary somewhat with the particular L-glutamic acid-producing micro-organism employed, it is preferred according to this invention to have the lower limit of added zinc, molybdenum or zinc+molybdenum at $10^{-7}$ mole; generally an amount higher than this limit will be employed. As will be evident from Note 2 supra, it is generally advantageous for the glutamine fermentation according to the present method to enhance the growth of the cells of the micro-organism by the inclusion of a growth-enhancing material such as biotin. However, neither biotin nor any of the other culture medium ingredients used in the preferred synthetic culture here employed provides any appreciable amount of zinc or molybdenum and certainly less than $10^{-8}$ mole. However, it is specific to the realization of the production of L-glutamine by the fermentation of an L-glutamic acid-producing micro-organism according to this invention that there be present in the culture medium at least $10^{-7}$ mole of these metals and preferably more.

However, it is possible to incorporate the requisite quantity of Zn and/or Mo into the culture medium in the form of organic materials containing sources of these metals, for example, bouillon, corn steep liquor, etc., whereby the addition in the form of zinc and/or molybdenum salts is not necessary. It is essential however that the materials included in the culture medium provide available Zn and/or Mo in an amount of at least $10^{-7}$ mole. It is preferable, for the purpose of industrial fermentation, however, to add the zinc and/or molybdenum in the form of inorganic salts, since better yields are obtained.

Any micro-organism can be used in the process of the invention, provided solely that it have an L-glutamic acid-producing ability in fermentation. Thus, use can be made of micro-organisms of the Micrococcus genus, Brevibacterium genus, Escherichia genus, Bacillus genus and others.

Culture media containing carbon sources, nitrogen sources, phosphoric acid sources, potassium sources, magnesium sources, iron sources, manganese sources and, in addition, nutrients with so-called micro-contents are used. For example, hydrocarbons such as sucrose, glucose and molasses, etc., and starch as well as saccharified solution of starch, etc., as the carbon sources; organic and inorganic nitrogen compounds such as ammonia, ammonium sulfate, ammonium chloride, ammonium nitrate, ammonium phosphate, ammonium carbonate, ammonium hydroxide, ammonium citrate, ammonium tartrate, ammonium acetate and urea, etc., and natural nutrient sources such as peptone, bouillon and corn steep liquor, etc. as the nitrogen sources; potassium dihydrogen phosphate and ammonium phosphate, etc. as the phosphoric acid sources; di-potassium hydrogen phosphate and potassium sulfate as the potassium sources; magnesium sulfate and magnesium chloride as the magnesium sources; ferrous sulfate and ferric sulfate as the iron sources; manganese sulfate and manganese chloride as the manganese sources; and, as other sources, nutrients with micro-contents, such as biotin and thiamine, etc., can be used.

The fermentation is carried out under aerobic conditions, as by so-called "shake" culture, aerating agitation culture, etc., and at a temperature in the range of 24° to 37° C. especially 28° to 33° C. is favorable as the culturing temperature. It is favorable to adjust the pH to 6 to 9 at the initiation of culture or during the period of culture. The culturing period is 2 to 3 days, and the L-glutamine is accumulated in the culture medium as a main product. The cultured solution is filtered, followed by absorption of the L-glutamine on ion exchange resin followed by elution; the eluate to which alcohol is added, is then concentrated while it is kept at almost neutral pH, and the L-glutamine can be finally obtained by cooling to crystallize L-glutamine, followed by separation (filtration, etc.) of the crystals.

Examples of presently preferred illustrative embodiments are as follows:

EXAMPLE 1

An aqueous medium of the following constitution is employed:

| | | |
|---|---|---|
| Glucose | wt. percent | 14.0 |
| $KH_2PO_4$ | do | 0.05 |
| $K_2HPO_4$ | do | 0.05 |
| $MgSO_4 \cdot 7H_2O$ | do | 0.05 |
| $MnSO_4 \cdot 4H_2O$ | do | 0.002 |
| $FeSO_4 \cdot 7H_2O$ | do | 0.002 |
| $(NH_4)_2SO_4$ | do | 4.0 |
| Urea | do | 0.5 |
| $CaCO_3$ | do | 2.0 |
| Biotin | γ/liter | 2.5 |
| Thiamine | mg./ml | 1 |

Three liters of culture medium prepared by adding $10^{-5}$ mole of each of zinc and molybdenum to the medium of the foregoing composition are charged into a fermentation tank of 5 liters capacity, into which *Micrococcus glutamicus* strain 2141 is then inoculated and cultured at 30° C. with aeration at the rate of 3 liters per minute and with agitation at 600 r.p.m.

A considerable amount of L-glutamine is noticeable in the culture medium after 40 hours of culturing and reaches 35 mg./ml. after 72 hours. The culture solution is filtered and then concentrated at neutral pH under reduced pressure, after which the formed L-glutamic acid is precipitated by adjusting the pH to 3.5. The culture medium is then filtered to remove the crystals of L-glutamic acid. The L-glutamine in the filtrate is adsorbed onto an ion exchange resin, and is then eluted therefrom. The eluate is concentrated, ethyl alcohol added, and the alcoholic mixture is cooled to yield 65 grams of crude crystals of L-glutamine.

EXAMPLE 2

An aqueous medium of the following composition is employed:

| | | |
|---|---|---|
| Glucose | wt. percent | 12.0 |
| $KH_2PO_4$ | do | 0.05 |
| $K_2HPO_4$ | do | 0.05 |
| $MgSO_4 \cdot 7H_2O$ | do | 0.05 |
| $MnSO_4 \cdot 4H_2O$ | do | 0.002 |
| $FeSO_4 \cdot 7H_2O$ | do | 0.002 |
| $(NH_4)_2SO_4$ | do | 4.0 |
| Biotin | γ/liter | 2.5 |
| Thiamine | mg./liter | 1 |

Fifteen liters of culture solution prepared by adding $10^{-5}$ mole of each of zinc and molybdenum to the above-described solution are charged into a fermentation tank of 30 liter capacity, into which *Micrococcus glutamicus* strain 1908 is then inoculated and cultured at 30° C. with aeration at the rate of 10 liters per minute and with agitation at 400 r.p.m., the pH being constantly adjusted to 7.0 with 15% aqueous $NH_4OH$ during the culture.

At the end of 72 hours, 30.5 mg./ml. of L-glutamine has been produced in the cultured solution. 275 grams of crude crystals of L-glutamine are obtained from this cultured solution by proceeding after the manner described in Example 1.

EXAMPLE 3

An aqueous medium of the following constitution is employed:

| | Percent by weight |
|---|---|
| Glucose | 12.0 |
| $KH_2PO_4$ | 0.05 |
| $K_2HPO_4$ | 0.05 |
| $MgSO_4 \cdot 7H_2O$ | 0.05 |
| $MnSO_4 \cdot 4H_2O$ | 0.002 |
| $FeSO_4 \cdot 7H_2O$ | 0.001 |

|  | Percent by weight |
|---|---|
| $(NH_4)_2SO_4$ | 3.0 |
| Bouillon | 0.05 |
| $CaCO_3$ | 3.0 |

Twenty liters of culture solution prepared by adding zinc or molybdenum individually or both together to the above described culture medium composition are transferred to a 250 milliliter capacity conical flask and then subjected to shaking culture at 28° C. for 72 hours, after inoculation with *Bacillus subtilis* strain 150. The results are shown in Table 4:

TABLE 4

| Zinc (moles) | Molybdenum (moles) | Amount of glutamine produced (mg./ml.) | Amount of bacterial cells (mg./ml.) |
|---|---|---|---|
| 0 | 0 | 0.13 | 12.0 |
| $10^{-7}$ | 0 | 0.17 | 11.5 |
| $10^{-5}$ | 0 | 0.30 | 11.2 |
| 0 | $10^{-7}$ | 0.16 | 13.0 |
| 0 | $10^{-5}$ | 0.25 | 12.0 |
| $10^{-7}$ | $10^{-7}$ | 0.33 | 12.8 |
| $10^{-5}$ | $10^{-5}$ | 0.38 | 11.8 |

EXAMPLE 4

The procedure according to Example 3 is repeated, except that *Escherichia coli* strain 128 is the inoculated strain rather than *Bacillus subtilis* strain 150. The obtained results are shown in Table 5:

TABLE 5

| Zinc (moles) | Molybdenum (moles) | Amount of L-glutamine produced (mg./ml.) | Amount of bacterial cells (mg./ml.) |
|---|---|---|---|
| 0 | 0 | 0.12 | 14 |
| $10^{-5}$ | 0 | 0.28 | 14.8 |
| 0 | $10^{-5}$ | 0.20 | 14.3 |
| $10^{-5}$ | $10^{-5}$ | 0.36 | 14.2 |

It will be understood that in the foregoing examples when reference is made to Zn (or zinc) or to Mo (or molybdenum), available zinc and available molybdenum are meant. Thus, it is convenient to add the zinc or molybdenum in the form of a water-soluble salt such as zinc chloride, zinc nitrate, zinc sulfate, ammonium molybdate, sodium molybdate, potassium molybdate and the like.

What we claim is:

1. A method for producing L-glutamine by fermentation which comprises aerobically culturing a strain of a micro-organism having L-glutamic acid-producing ability in an aqueous nutrient medium therefor, said nutrient medium containing more than $10^{-7}$ mole of a member selected from the group consisting of Zn, Mo and a mixture of Zn and Mo in solution therein.

2. A method according to claim 1, wherein the Zn, Mo or mixture of Zn and Mo is added in the form of a water-soluble salt thereof.

3. A method according to claim 3, wherein the Zn is added in the form of $ZnSO_4 \cdot 7H_2O$ and the Mo is added in the form of $(NH_4)_6Mo_7O_{24} \cdot 4H_2O$.

4. A method according to claim 1, wherein the microorganism is of the Micrococcus genus.

5. A method according to claim 4, wherein the microorganism is *Micrococcus glutamicus*.

6. A method according to claim 5, wherein the microorganism is *Micrococcus glutamicus* strain 2141.

7. A method according to claim 5, wherein the microorganism is *Micrococcus glutamicus* strain 1908.

8. A method according to claim 1, wherein the microorganism is of the genus Brevibacterium.

9. A method according to claim 1, wherein the microorganism is of the genus Bacillus.

10. A method according to claim 9, wherein the microorganism is *Bacillus subtilis* strain 150.

11. A method according to claim 1, wherein the microorganism is of the Escherichia genus.

12. A method according to claim 11, wherein the microorganism is *Escherichia coli* strain 128.

13. A method of converting into L-glutamine fermentation an L-glutamic acid fermentation method which is carried out with a microorganism having L-glutamic acid-producing ability in an aqueous medium containing nutrients required for the growth of the microorganism and the production of L-glutamic acid, which comprises carrying out said L-glutamic acid fermentation in the presence in the fermentation medium of at least $10^{-7}$ mole of a member selected from the group consisting of Zn, Mo and a mixture of Zn and Mo in solution therein.

References Cited

UNITED STATES PATENTS 3,216,906  11/1965  Kinoshita et al.

LIONEL M. SHAPIRO, *Primary Examiner.*

UNITED STATES PATENT OFFICE
CERTIFICATE OF CORRECTION

Patent No. 3,414,478                      December 3, 1968

Yuichi Noguchi et al.

It is certified that error appears in the above identified patent and that said Letters Patent are hereby corrected as shown below:

In the heading to the printed specification, after line 7, insert -- Claims priority, application Japan, Dec. 22, 1964, 72,014/64 --.

Signed and sealed this 17th day of March 1970.

(SEAL)
Attest:

Edward M. Fletcher, Jr.             WILLIAM E. SCHUYLER, JR.
Attesting Officer                    Commissioner of Patents